United States Patent Office

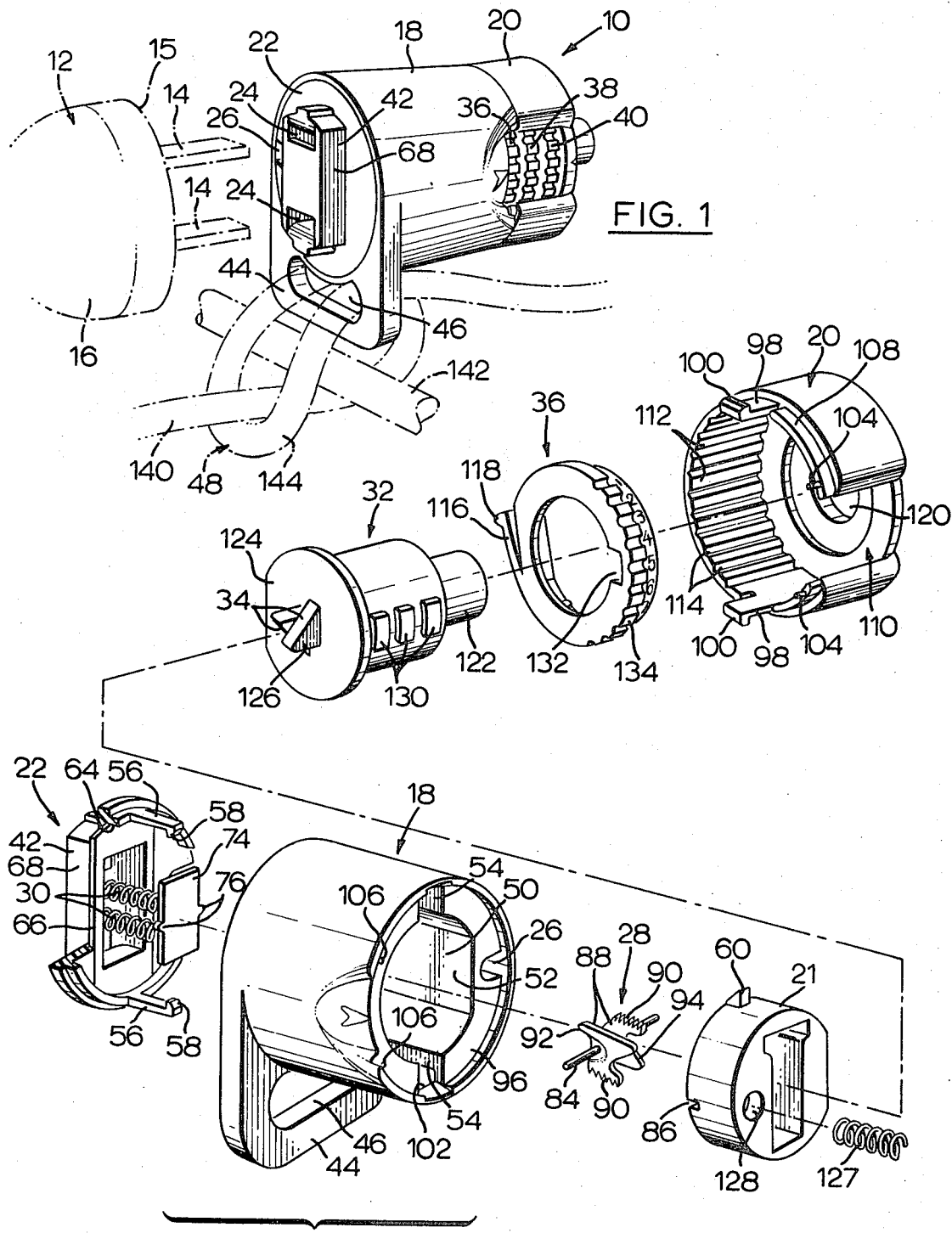
Dec. 1, 1970 — E. N. EFSTON — 3,543,544
LOCKING DEVICE FOR USE WITH AN ELECTRIC PLUG
Filed Aug. 19, 1968
INVENTOR.
EVAN N. EFSTON

3,543,544
Patented Dec. 1, 1970

3,543,544
LOCKING DEVICE FOR USE WITH AN
ELECTRIC PLUG
Evan N. Efston, 69 Goodwill Ave.,
Downsview, Ontario, Canada
Filed Aug. 19, 1968, Ser. No. 753,688
Int. Cl. E05b 65/00; H01r 13/62, 13/54
U.S. Cl. 70—57                                                              5 Claims

ABSTRACT OF THE DISCLOSURE

A locking device for disabling an electrical plug to prevent unauthorized use of electrical equipment comprising a housing adapted to receive the plug prongs therein, spring-loaded pawls pivotally mounted within the housing for retaining the prongs therein by frictional engagement, and a combination lock for releasing the pawls and the prongs secured thereby.

BACKGROUND OF THE INVENTION

The present invention relates to locking devices for use with electrical plugs having prongs. In particular, the invention relates to locking devices in which electrical plugs may be secured to prevent unauthorized use of electrical equipment connected to such plugs.

By the use of the locking devices of the present invention, it is, for instance, possible to prevent the use of complex and expensive electrical and/or electronic equipment by unauthorized persons. This can be of considerable importance, for example, in the case of expensive office equipment such as electrical typewriters, photocopying machines, duplicating machines, data-processing equipment, etc. and electronic laboratory equipment and the like where unauthorized use of such machines and equipment may lead not only to undesirable wear of the machines but even to serious damage.

A further application for the locking devices of the present invention is for the disabling of potentially dangerous electrical equipment. The locking devices of the present invention may, for example, be used with the electrical plugs of power tools and home appliances to prevent their mischievous operation by children with the possibility of serious if not fatal accidents consequently occurring.

And a further application of the present invention resides in the use of the locking device of the invention with the plug cord for securing the electrical equipment attached to the cord to a stationary object.

Locking devices for the aforementioned purposes have previously been proposed but many of these devices have relied in their operation on the insertion of locking pins into the holes normally provided in the prongs of electrical plugs. One serious disadvantage of this known type of locking device is that, if the prongs of the electrical plug have become at all bent or distorted in use, as frequently occurs, the alignment of such holes with such locking pins becomes impossible and this frequently means that such locking devices cannot be used effectively. Also, some plug manufacturers, do not provide holes in the plug prongs and the holes, if present, are not of standard diameter, shape or a fixed distance from the plug base.

It is accordingly an object of the present invention to provide a locking device for the plugs of electrical equipment which will function satisfactorily if the prongs of the electrical plug have become bent or distorted slightly in use and which does not require the presence of prong holes.

It is a further object of the present invention to provide a locking device effective for operation with electrical plugs having one, two, three or even more prongs, which device is relatively simple in its construction but effective in its operation.

And a further object of the invention is the provision of a locking device which can be used with the attached electric cord to secure connected equipment to a stationary object.

SUMMARY OF THE INVENTION

In its broadest scope, a locking device in accordance with the present invention comprises a housing having an opening therein for receiving the prong of an electrical plug, gripping means disposed within said housing and adapted for movement between a prong-releasing position and a prong-gripping position in which said prong is retained within said housing by frictional engagement of said gripping means and a surface of said prong, spring means normally urging said gripping means into said prong-gripping position, and release means adapted to actuate movement of said gripping means from said prong-gripping position to said prong-releasing position.

Normally, a locking device in accordance with the invention will additionally comprise locking means adapted to prevent unauthorized actuation of said release means.

In accordance with a preferred feature of the present invention, the locking device additionally comprises means adapted to expel said prong from within said housing on said movement of said gripping means from said prong-gripping position to said prong-releasing position.

Although any suitable gripping means may be used in the devices of the present invention, particularly effective devices have been constructed in which the aforementioned gripping means comprises a pivotally mounted pawl having an edge surface adapted to engage a surface of said prong in which said spring means normally urges said edge surface of said pawl into engagement with said surface of said prong.

A particularly suitable release means for use in the locking devices of the invention comprises a cam surface which engages the pawl hereinbefore mentioned to move the pawl, on actuation of the release means, from its prong-gripping position to its prong-releasing position.

Any appropriate locking means may be used in the devices of the invention but it will be seen from the description which follows of a specific embodiment of the invention that the devices of the invention lend themselves to the use of combination locks with rotational locking rings.

The following detailed description also gives details of a particularly effective means for ejecting the electrical plug from the locking device when the release means are actuated.

BRIEF DESCRIPTION OF THE DRAWINGS

The invention will now be described by way of illustration with reference to the accompanying drawings, in which:

FIG. 1 is a perspective view of one embodiment of a locking device in accordance with the invention;

FIG. 2 is an exploded perspective view of the locking device of FIG. 1;

Like reference characters refer to like parts throughout the description of the drawings.

DESCRIPTION OF THE PREFERRED EMBODIMENTS

Figure 3:
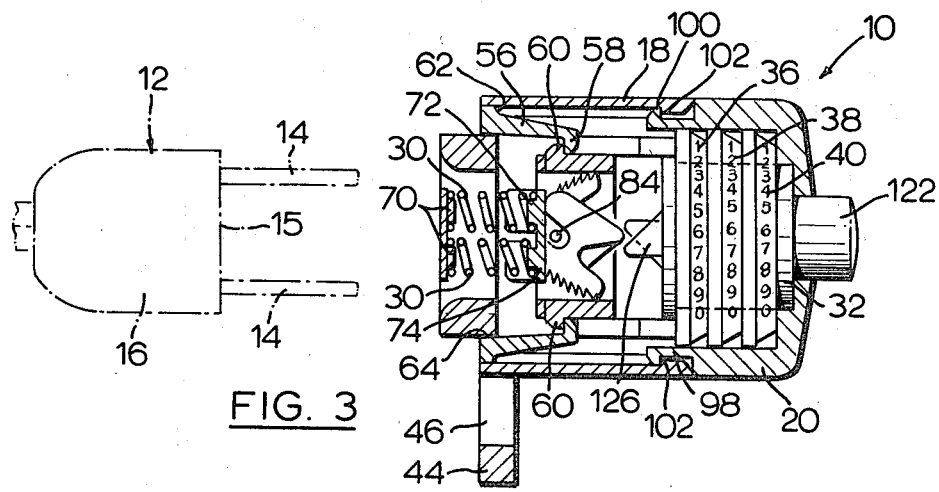
FIG. 3 is a vertical axial sectional view, partly in elevation, through the locking device of FIG. 1 showing the prongs of an electrical plug about to be inserted into the device.

The particular locking device shown in the accompanying drawings and generally indicated at 10 in FIG. 1 thereof is designed for use with a standard 2-pin electrical plug 12 having pins or prongs 14 projecting from the front surface 15 of a plug housing 16. As will be explained hereinafter, the locking device 10 may, however, also be used with a standard electrical 3-pin plug.

Before identifying the various specific structural components of the device 10, the several essential structural components of the device as hereinbefore enumerated will first be identified. For convenience, the end of the device 10 adjacent the electrical plug 12 will be referred to hereinafter as the forward end while the end remote from the electrical plug will be referred to as the rearward end. The device 10 comprises a housing formed by a forward generally cylindrical member 18, a rearward generally cup-shaped member 20, an insert 21 and a forward end plate 22. Disposed generally within the forward end plate 22, there are provided two openings 24 for receiving the prongs 14 of the plug 12 as well as an opening 26 for receiving the grounding pin or third prong (not shown) of a three-pin electrical plug.

With particular reference now to FIG. 2, gripping means generally indicated at 28 are provided within the housing and are adapted for pivotal movement between a prong-releasing position and a prong-gripping position as will be explained in greater detail hereinafter. The gripping means 28 normally are urged into the prong-gripping position by spring means which, in the device illustrated, is constituted by helical compression springs 30. The additional prong-ejecting function of these springs 30 will be explained hereinafter.

The remaining essential component of a locking device in accordance with the invention is the release means which, in the device 10 illustrated, is constituted basically by a lock barrel 32 provided with cam surfaces 34 formed at one end.

In addition to the essential structural components already identified, the locking device 10 shown in the drawings includes several optional structural features. In the first place, the device 10 comprises a locking means for preventing unauthorized actuation of the release means. This locking means is in the form of a combination lock comprising locking rings 36, 38 and 40 which co-operate, as will be explained hereinafter, with tongues provided on the lock barrel 32.

A second optional feature incorporated in the device 10 is a means adapted to expel the prongs 14 of the plug 12 from the device 10 on movement of the gripping means 28 from their prong-gripping position to their pring-releasing position. This means for expelling the prongs 14 is essentially formed by the aforementioned helical compression springs 30 and a prong-receiving frame 42 containing the prong-receiving openings 24.

Other optional structural components included in the device 10 will be mentioned as the detailed description of the structure of the device 10 proceeds.

Referring again to the structure of the housing, it will be noted that the forward generally cylindrical member 18 has, at its forward end, a transversely extending flange 44 with a slotted opening 46 formed therethrough to enable the device 10 to be secured to the cord 48 of the plug 12, as shown in FIG. 1.

Extending forwardly from the rearward end of the generally cylindrical member 18, there is provided a generally axial passage 50 having a cross-sectional shape being that of a major segment of a circle, the limiting cord of which defines a planar surface 52. The insert 21 is externally dimensioned so as to be slidingly receivable within the passage 50. Extending throughout the length of the generally cylindrical member 18, there are provided a pair of diametrically opposed axially extending peripheral passages 54.

The forward end plate 22 has a pair of diametrically opposed and integrally formed, rearwardly extending resilient fingers 56 which are received within passages 54 and which terminate at their rearward ends in radially inwardly directed lugs 58. In the assembled structure, as shown most clearly in FIGS. 3–6, these lugs 58 engage a corresponding pair of radially outwardly extending and diametrically opposed lugs 60 integrally formed with the insert 21. When the forward end plate 22 is assembled in the forward end of the generally cylindrical member 18, it is supported against rearward axial movement by a radially extending shoulder 62 formed in the generally cylindrical member 18.

Figures 4, 5:
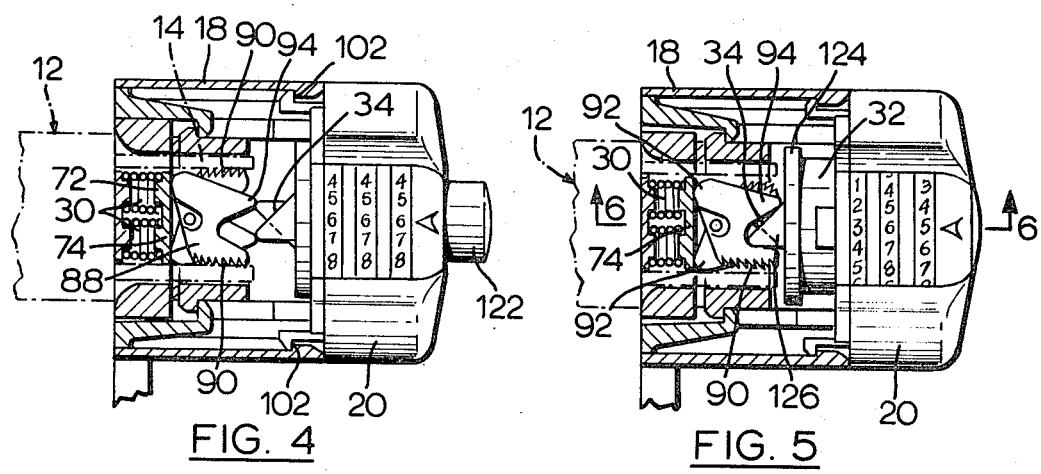
FIG. 4 is a view similar to that of FIG. 3 but showing the prongs of the electrical plug inserted into the locking device and retained therein by the prong-engaging means.
FIG. 5 is a view similar to that of FIG. 4 but showing the relative positions of the structural components of the device at the instant that the release means are actuated.
Figure 6:
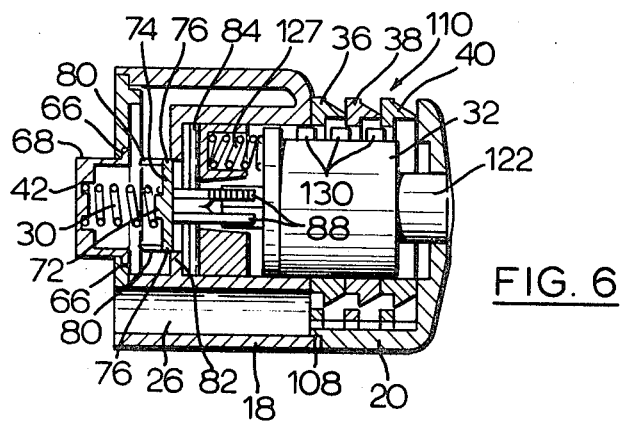
FIG. 6 is a horizontal axial sectional view through the locking device of FIG. 1.

Centrally through the forward end plate 22, there is provided an elongated transverse opening 64 through which the prong-receiving frame 42 is free to move axially between the projecting position shown in FIGS. 1, 3 and 6, and the retracted position shown in FIGS. 4 and 5. The forward movement of the frame 42 is restricted by engagement of the rearwardly directed surface of the forward end plate 22 with a flange 66 integrally formed at the rearward end of the side walls 68 of the frame 42. The frame 42 is provided in the rearwardly directed surface of its forward end with two studs 70 by which the forward ends of the helical compression springs 30 are anchored.

With particular reference now also to FIG. 6, the springs 30 are similarly radially anchored at their rearward ends by studs 72 provided for this purpose on the forwardly directed surface of a generally rectangular plate 74 having a pair of outwardly extending lugs 76 received in slots provided for this purpose in axially extending ears 80 integrally formed with a web 82 disposed across the forward end of the generally axial passage 50. A spindle 84 is received within a diametrical semicircular recess 86 formed in the forward surface of the insert 21 and is retained therein by engagement with the rearwardly directed surface of the web 82.

Mounted for free pivotal movement on the spindle 84, there is a pair of pawls 88. Each of these pawls 88 has a serrated edge 90 for engagement with the adjacent surfaces of the prongs 14 of the plug 12 and a forwardly directed cam surface 92 which engages the generally rectangular plate 74. Each pawl 88 also has a rearwardly directed cam surface 94 which engages the corresponding cam surface 34 provided on the forward end of the lock barrel 32 as will be explained in greater detail hereinafter.

It should be noted at this stage that the opening 26 extends through the forward end plate 22 and the web 82 as well as through an annular web 96 provided at the rearward end of the generally cylindrical member 18 between the passage 50 and the outer peripheral wall.

Referring again to the rearward generally cup-shaped member 20, it will be seen from FIG. 2 that this member is provided with two integrally formed, diametrically opposed and forwardly extending resilient fingers 98 provided at their forward ends with radially outwardly extending lugs 100 which, in the assembled form of the device 10, are received in peripheral recesses 102 provided slightly forward of the annular web 96, see FIGS. 3, 4 and 5.

In order to ensure a more precise axial alignment of the generally cup-shaped member 20 with the generally cylindrical member 18, the former may be provided with integrally formed forwardly extending peripheral pins 104 which, in the assembled form of the device 10, are received in corresponding openings 106 in the rearward surface of the generally cylindrical member 18. In the particular construction shown in the drawings, the generally cup-shaped member 20 is provided at its forward end with a skirt 108 of reduced diameter which is received within the reaward end of the peripheral wall of the generally cylindrical member 18 and which seats against the web 96. It will be understood that members 18, 20 comprising the shell of the housing can be formed integral, if desired.

Referring again to FIG. 2, it will be seen that the peripheral wall of the generally cup-shaped member 20 is partially cut away to provide an opening 110 permitting access to locking rings 36, 38 and 40. The generally cup-shaped member 20 is also provided about approximately half its circumference on its inner peripheral surface with longitudinally extending ridges 112 and grooves 114 which cooperate with resilient pawl members 116 having rounded heads 118 and integrally formed with the locking rings 36, 38 and 40 to ensure stepwise rotation of the latter as the heads 118 are moved between adjacent grooves 114 in a manner which will be understood more fully as the description proceeds.

An axial opening 120 is provided in the rear end plate of the generally cup-shaped member 20 and a rearwardly projecting reduced diameter cylindrical portion or push button 122 of the lock barrel 32 extends for axial movement through this opening 120.

At the forward end of the generally cylindrical barrel lock 32, i.e. at the opposite end to the push button 122, there is provided an integrally formed radially extending flange 124 having an external configuration corresponding to the internal sectional configuration of the generally axial passage 50. From the forwardly directed surface of the forward end of the barrel lock 32, there project forwardly two integrally formed and generally wedge-shaped studs 126 providing the cam surfaces 34 which cooperate with rearwardly directed cam surfaces 94 of the pawls 88 in a manner that will be more readily understood when the description of the operation of the device 10 is given.

A helical compression spring 127 is disposed longitudinally between the forward end surface of the lock barrel 32 and the rearward end surface of the insert 21, a circular recess 128 being provided in the rearward end surface of the insert 21 to maintain this spring 127 in position.

With further reference to the lock barrel 32, it will be seen from FIG. 2 that, in the particular construction illustrated, this member is provided with three integrally formed, radially extending and longitudinally separated peripheral tongues 130.

The locking rings 36, 38 and 40, which are coaxially disposed about the lock barrel 32, are provided in their internal peripheral surfaces with radially extending peripheral recesses 132 of dimensions such that they will receive the respective tongues 130. On their external peripheral surfaces, the locking rings 36, 38 and 40 are provided with knurled surfaces 134 and peripherally spaced numerical indices by means of which the radial positions of the recesses 132 may be identified.

It will be appreciated that limited axial movement of the lock barrel 32 between the outer position shown in FIG. 3 and the inner position shown in FIG. 5 will be possible only when each recess 132 of the locking rings 36, 38 and 40 is radially aligned with the corresponding tongue 130 by the correct setting of the numerical indices.

Having described in detail the various structural components of the locking device 10, the manner of operation of the device will now be described.

In use, the prongs 14 of the electrical plug 12 are inserted into the prong-receiving openings 24 and a rearwardly directed force is applied manually to the plug 12 to compress the helical compression springs 30 and to move the prong-receiving frame 42 from its projecting position, FIG. 3, to its retracted position, FIG. 4. During this insertion of the prongs 14, the pawls 88 pivot about the spindle 84 so that their serrated edges 90 frictionally engage the inner opposing surfaces of the prongs 14 to hold the prongs 14 securely in the device 10, the prong surface 15 of the plug housing 16 engaging the forward surface of the prong-receiving frame 42 and holding it in its retracted position.

When it is desired to release the electrical plug 12 from the locking device 10, it is necessary to actuate the release means by pressing the push button 122 forwardly from its outer position, FIG. 4, to its inner position, FIG. 5, against the action of the compression spring 127. Such forward movement of the push button 122 and consequently of the lock barrel 32 is, however, only possible if the locking rings 36, 38 and 40 have previously been rotated about the lock barrel 32 to such axial positions that each of the peripheral recesses 132 is aligned with its respective peripheral tongue 130.

Assuming that the recesses 132 have first been aligned with the tongues 130 by appropriate rotation of the locking rings 36, 38 and 40, forward movement of the push button 122 and consequently of the lock barrel 32 causes engagement of the cam surfaces 34 with the rearwardly directed cam surfaces 94 of the pawls 88. This engagement of the cam surfaces 34 and 94 causes rotation of the pawls 88 to the positions shown in FIG. 5, thus releasing the frictional engagement of the serrated edges 90 with the prongs 14. The compression springs 30 now act to urge the prong-receiving frame 42 from its retracted position, FIG. 5, to its projected position, FIG. 3. This forward movement of the frame 42 applies a similar movement to the plug 12 which by virtue of its resulting momentum continues its forward movement after the frame 42 reaches its projecting position thereby resulting in complete ejection of the plug 12 from the locking device 10.

If it is desired to secure the electrical equipment which is attached to the plug 12 by cord 140, shown by ghost lines, to securing means such as stationary rod 142, also shown by ghost lines, the cord 140 is doubled, the doubled portion 144 passed through opening 46 of bracket 44, the free end of the cord having plug 12 passed around rod 142, through doubled portion 144, and the plug locked in the locking device of the invention.

What I claim as new and desire to protect by Letters Patent of the United States is:

1. A locking device for use with an electrical plug having a prong which device comprises a housing having an opening therein for receiving said prong, a pivotally mounted pawl having an edge surface for engaging a surface of said prong disposed within said housing and adapted for movement between a prong-releasing position and a prong-gripping position in which said prong is retained within said housing by frictional engagement of said pawl edge surface and a surface of said prong, spring means normally urging said pawl into said prong-gripping position, release means comprising a lock barrel having a cam surface formed on one end thereof, said lock barrel being mounted for longitudinal movement in a guideway within said housing between an outer position in which the end of said barrel remote from said cam surface projects outside said housing and an inner position in which said cam surface engages said pawl to move said pawl from said prong-gripping position to said prong-releasing position upon actuation of said release means, spring means operatively engaging said lock barrel for normally urging said barrel into said outer position, means adapted to expel said prong from within said housing on movement of said lock barrel, and locking means adapted to prevent unauthorized actuation of said release means.

2. A locking device as claimed in claim 1 in which said barrel is provided with at least one radially extending peripheral tongue adapted to cooperate with an appropriate recess in the inner surface of a coaxial locking ring rotatably disposed about said barrel whereby said barrel may only be moved from said outer position to said inner position when said recess and said tongue are radially aligned.

3. A locking device for use with an electrical plug having a prong, which device comprises a housing, a frame having an outer surface adapted to engage a surface of said electrical plug and mounted for movement between a retracted position and a projecting position with respect to said housing, said frame having an opening therein for receiving said prong, a pivotally mounted pawl having an edge surface for engaging a surface of said prong disposed within said housing and adapted for movement between a prong-releasing position and a prong-gripping position whereby said prong is retained within said housing by frictional engagement of said pawl edge surface and a surface of said prong, said release means comprising a cam surface adapted to engage said pawl to move said pawl, on actuation of said release means, from said prong-gripping position to said prong-releasing position, a helical compression spring disposed within said housing engaging and normally urging said frame to said projecting position, said helical compression spring also engaging a movable plate which in turn engages said pawl normally to urge said pawl into said prong-gripping position, whereby, on the insertion of said prong into said opening, said frame is manually moved against the bias of said helical compression spring into said retracted position and said pawl is urged into its prong-engaging position and whereby, on actuation of said release means to move said pawl from said prong-gripping position to said prong-releasing position, said frame is moved by the action of said helical compression spring from said retracted position to said projecting position whereby in turn said plug is expelled from said locking device by virtue of the engagement of said outer surface of said frame with said surface of said electrical plug.

4. A locking device as claimed in claim 3 in which said cam surface is provided on an end surface of a lock barrel mounted for longitudinal movement in a guideway within said housing between an outer position in which the end of said barrel remote from said cam surface projects outside said housing and an inner position in which said cam surface engages said pawl to move said pawl from said prong-gripping position to said prong-releasing position, and in which spring means are provided normally to urge said barrel into said outer position.

5. A locking device as claimed in claim 4 in which said barrel is provided with at least one radially extending peripheral tongue adapted to cooperate with an appropriate recess in the inner surface of a coaxial locking ring rotatably disposed about said barrel whereby said barrel may only be moved from said outer position to said inner position when said recess and said tongue are radially aligned.

References Cited

UNITED STATES PATENTS

| | | | |
|---|---|---|---|
| 2,654,073 | 9/1953 | Katz | 339—37 |
| 2,664,734 | 1/1954 | McEneaney | 339—37 |
| 2,733,416 | 1/1956 | Evalt | 339—37 |
| 2,746,021 | 5/1956 | Butkovich | 339—45 |

FOREIGN PATENTS 139,323  11/1934  Germany.

MARVIN A. CHAMPION, Primary Examiner

E. J. McCARTHY, Assistant Examiner

U.S. Cl. X.R.

70—312; 339—45, 82